March 23, 1954
C. R. WEISHUHN
2,673,307
VEHICLE SAFETY SIGNALING DEVICE
Filed Nov. 10, 1952
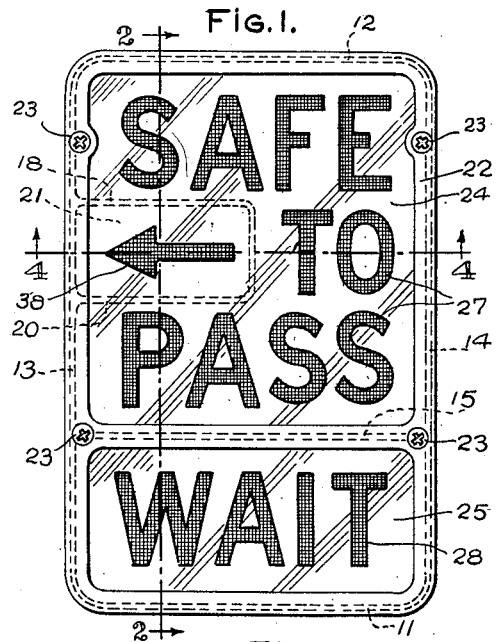
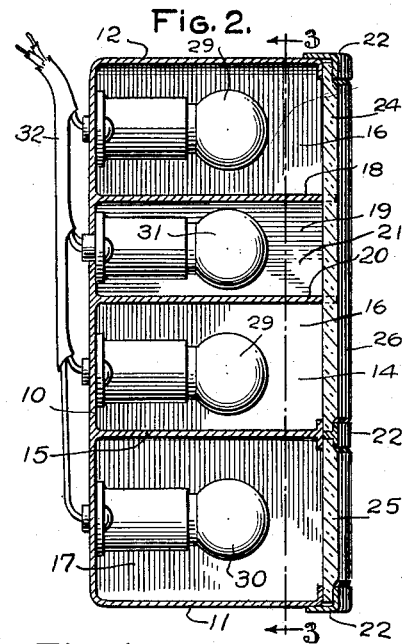
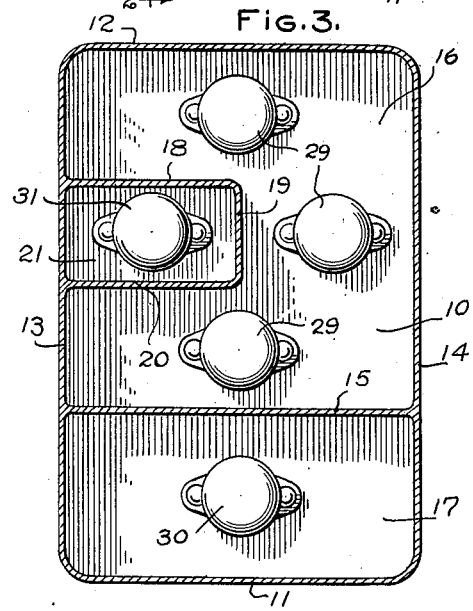
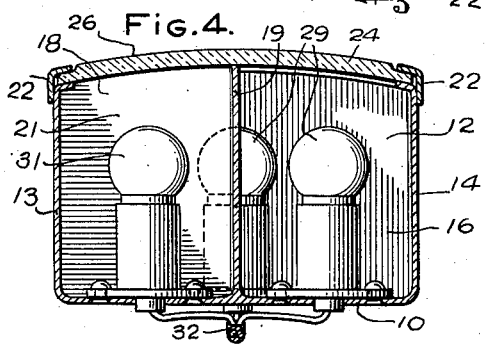
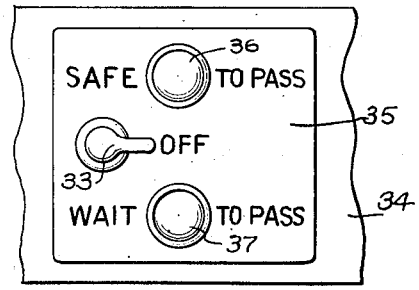
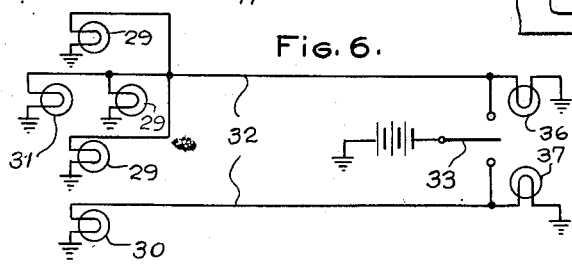
INVENTOR
Cecil R. Weishuhn Patented Mar. 23, 1954

2,673,307

UNITED STATES PATENT OFFICE 2,673,307

VEHICLE SAFETY SIGNALING DEVICE

Cecil R. Weishuhn, Grand Blanc, Mich.

Application November 10, 1952, Serial No. 319,740

2 Claims. (Cl. 315—77)

The present invention relates to a safety passing light and it consists in the combinations, constructions and arrangements of parts herein described and claimed.

Generally there is provided a passing light adapted to be attached to the rear of trucks or the like and which is divided into a relatively large upper compartment and a relatively smaller lower compartment. The upper compartment is provided with a curved glass window upon which is printed or otherwise displayed the words "safe to pass." The lower compartment is provided with a curved glass window upon which is depicted the word "wait." The glass of the upper compartment is colored green while that of the lower compartment is colored amber. A novel feature of the invention is the provision with the upper compartment of a relatively small separate compartment which lies immediately behind a portion of the glass window upon which is depicted an arrow. Within the last-mentioned compartment there is provided a lamp having a conventional flashing means incorporated therein and in the other two compartments there is provided suitable lamps for lighting the windows. The device is such that the upper or lower compartments may be lighted at the will of the operator of the vehicle upon which the device is mounted.

It is accordingly an object of the invention to provide a signal of the character set forth which is simple in construction, inexpensive to manufacture and yet effective and efficient in use.

Another object of the invention is to provide, in a device of the character set forth, a novel separate compartment containing a flashing lamp adapted to illuminate a portion of a window covering a larger compartment in which such first mentioned compartment is located.

Other and further objects of the invention will become apparent from a reading of the following specification taken in conjunction with the drawing, in which:

Figure 1 is a front elevational view of an embodiment of the invention,

Figure 2 is a vertical longitudinal sectional view taken on line 2—2 of Figure 1.

Figure 3 is a vertical transverse sectional view taken on line 3—3 of Figure 2,

Figure 4 is a horizontal sectional view taken on line 4—4 of Figure 1,

Figure 5 is a front elevational view of a switch forming a part of the invention, and Figure 6 is a diagrammatic wiring view of the electric circuit used with the signaling device.

Referring more particularly to the drawing, there is shown therein a housing having a rear wall 10, a bottom wall 11, a top wall 12 and side walls 13 and 14. Interconnecting the side walls 13 and 14 in spaced relation to the bottom wall 11 is a partition 15 which divides the casing vertically into a relatively large upper compartment 16 and a relatively smaller lower compartment 17.

Formed centrally in the compartment 16 adjacent the side wall 13 by means of smaller walls 18, 19 and 20 together with the wall 13 is an inner compartment 21. A frame 22 is affixed to the forward edges of the casing 10 by means of screws 23 or the like and is provided with a pair of openings for the display therethrough of the interiors of the compartments 16 and 17. A relatively large window 24 is mounted in the upper end of the frame 22 while a relatively smaller window 25 is mounted in the lower portion of the frame 22. The windows 24 and 25 are curvular when viewed from above, as indicated at 26 in Figure 5 and the window 24 is colored green while the window 25 is colored amber.

The window 24 has painted or otherwise depicted thereon the words "safe to pass," as shown at 27 while the window 25 has depicted thereon the word "wait" as shown at 28. Within the compartment 16 there is provided a plurality of lamps 29 while within the lower compartment 17 there is provided a lamp 30. A lamp 31 of the flashing type is mounted in the compartment 21. Suitable wiring such as is indicated at 32 is provided for interconnecting the lamps with a switch 33 mounted upon an instrument panel 34 in the vehicle carrying the device of the present invention. The switch 33 is mounted in a plate 35 which also has mounted therein an upper lamp 36 colored green and a lower lamp 37 colored red.

In operation, when the three position switch 33 is moved to its upper position, it will act to light the lamp 36 and the lamps 29 together with the flashing light 31. This will illuminate the words "safe to pass" with a steady green light and will likewise illuminate an arrow 38 formed on that portion of the window 24 over the compartment 21. When the switch 33 is moved to its lower position, it will light the signal lamp 36 and the lamp 30 thus illuminating the lower compartment 17 and the word "wait" on the window 25.

It will be seen that the device provides a definite signal to oncoming traffic approaching the rear of a truck or the like upon which this present invention may be mounted thus clearly indicating when it is safe to pass to the left of such vehicle and also indicating clearly when it is desirous to wait before attempting to so pass.

While but one form of the invention has been shown and described herein, it will be readily apparent to those skilled in the art that many minor modifications may be made without departing from the spirit of the invention or the scope of the appended claims.

What is claimed is:

1. A device of the character described comprising a casing, having an open front wall, a partition in said casing dividing the same into a relatively large compartment and a relatively small compartment, a glass window for each of said compartments, indicia upon the window of the larger compartment indicating that it is safe to pass, indicia upon the window of the smaller compartment indicating wait before attempting to pass, a third compartment formed within said first compartment, said third compartment having an open front wall, an arrow depicted upon the window of the relatively large compartment immediately in front of the open front of said third compartment, illuminating lamps in each of the first-mentioned compartments, a flashing lamp in said third compartment, and means for selectively lighting said lamps.

2. A device of the character described comprising a casing, having an open front wall, a partition in said casing dividing the same into a relatively large compartment and a relatively small compartment, a glass window for each of said compartments, indicia upon the window of the larger compartment indicating that it is safe to pass, indicia upon the window of the smaller compartment indicating wait before attempting to pass, a third compartment formed within said first compartment, said third compartment having an open front wall, an arrow depicted upon the window of the relatively large compartment immediately in front of the open front of said third compartment, illuminating lamps in each of the first-mentioned compartments, a flashing lamp in said third compartment, and means for selectively lighting said lamps, said means including suitable electrical circuits and a three-position switch, one of said positions controlling the lamp in said lower compartment, one of said positions controlling the lamps in the other two compartments, and the third position being the "off" position for all of said lamps.

CECIL R. WEISHUHN.

References Cited in the file of this patent

UNITED STATES PATENTS

| Number | Name | Date |
|---|---|---|
| 1,893,371 | Knowlton | Jan. 3, 1933 |
| 2,044,300 | Heans | June 16, 1936 |
| 2,464,535 | Smith, Jr. | Mar. 15, 1949 |
| 2,517,173 | Blasingame | Aug. 1, 1950 |
| 2,597,584 | Hopkins | May 20, 1952 |